Inventors
Grant V. W. Roth
Stephen Guarnaschelli
by Parker & Carter
Attorneys

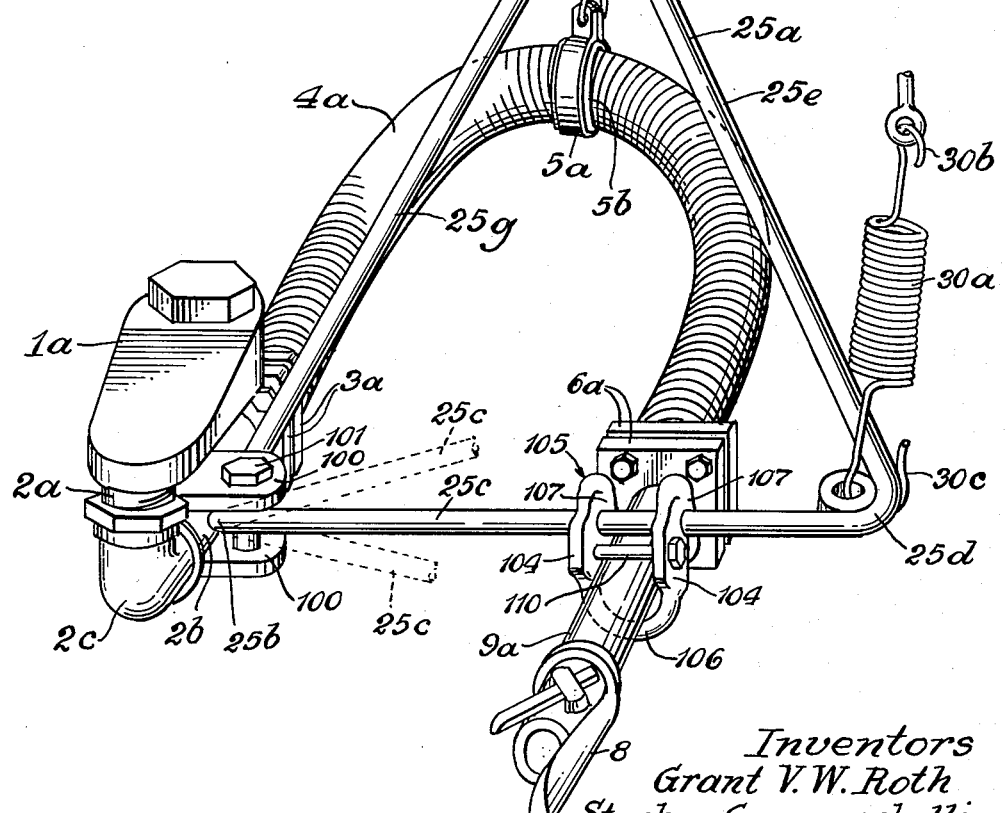

United States Patent Office 2,996,315
Patented Aug. 15, 1961

2,996,315
PROTECTIVE CONDUIT SUPPORT
Grant V. W. Roth, 2630 Asbury Ave., Evanston, Ill., and Stephen Guarnaschelli, Garden City Park, N.Y., assignors to Grant V. W. Roth, Evanston, Ill., as trustee under The Naugatuck Trust
Filed Oct. 4, 1955, Ser. No. 543,762
7 Claims. (Cl. 285—2)

This invention relates to conduits and particularly to supporting means for such conduits, which supporting means is effective to prevent injury to the conduit under particular circumstances.

Another object of the invention is to prevent the stretching of conduits, such as those normally between adjacent railway cars when, for example, due to human error or otherwise, the cars are separated without prior separation of the conduit couplers.

Another object of the invention is to provide supporting means for conduits, such as the conduits between adjacent railway cars, which supporting means are arranged to break prior to the stretching of such conduits due to separation of the railway cars before the conduit couplers have been separated.

Another object of the invention is to provide a "pull-off" support rigging for flexible conduits which will be effective to assure that, upon unintended separation of the vehicles to which the conduits are attached, the entire conduit attached to one of the vehicles will be torn loose intact thus preventing distortion or injury to the conduit itself and permitting its reinstallation and reuse.

Another purpose is to provide support means for flexible conduits which will be effective to spread and disseminate the stresses and strains caused by swiveling and twisting resulting from the movement of the vehicles to which the flexible conduits are attached, throughout the entire conduit and thus preventing injurious concentration of such stresses at any one point on said conduits.

Another purpose is to provide an effective supporting structure for flexible conduits which will permit the conduit to move up, down, to either side, forwardly or rearwardly in response to turning and twisting of the vehicles to which the conduits are attached, without injury to the conduit and without affecting its function.

Other objects will appear from time to time in the course of the specification and claims.

The present application is a continuation-in-part of our co-pending application, Serial No. 469,659, filed November 18, 1954.

We illustrate our invention more or less diagrammatically in the accompanying drawings, wherein:

FIGURE 3 is a top detail view illustrating one element of the structure of FIGURE 2 on an enlarged scale;

FIGURE 4 is a front view of the structure illustrated in FIGURE 3;

FIGURE 5 is a view in partial cross section taken on the line 5—5 of FIGURE 4;

FIGURE 6 is a perspective view of the structure illustrated in FIGURES 3–5;

FIGURE 7 is a perspective view of an alternative form of my invention; and

FIGURE 8 is a partial top view on a reduced scale, illustrating the structure of FIGURE 7 installed at one end of a rail car.

Like parts are indicated by like numerals throughout the specification and drawings.

Figure 1:
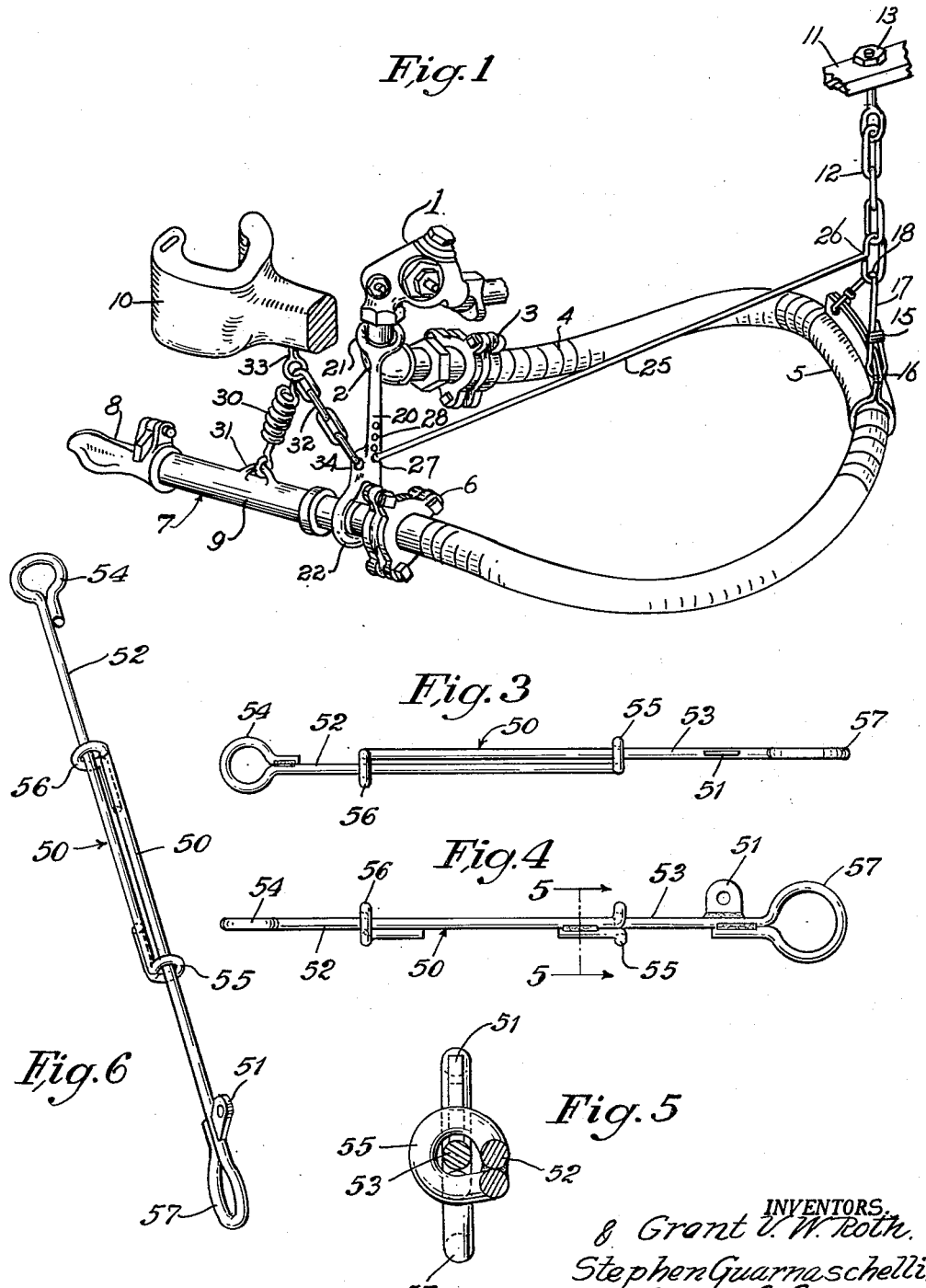
FIGURE 1 is a perspective view.

Referring now to the drawings, an end valve for the steam line of a railway car is illustrated generally at 1.

A pipe fitting or nipple for the end valve 1 is shown generally at 2. A hose connection or fitting 3 is secured to the nipple 2 and connects therewith the conduit or hose, which may be the flexible metallic hose 4. Hose 4 is curved or looped as indicated generally at 5, upon itself, and terminates in a hose fitting or connection 6 to which is secured a coupler member 7 which may be comprised of the coupler mechanism 8 and an adapter portion 9. It will be realized that the coupler member 7 is normally formed of solid or generally rigid metal. 10 illustrates, generally diagrammatically, a section of the draw bar such as those normally found in association with railway cars. The underside of a rail car is indicated partially at 11.

A chain support 12 may be secured to the underside of the rail car 11 as shown generally at 13, and may extend downwardly therefrom to support the conduit 4, as shown generally at 15. The support indicated generally at 15 includes a conduit-surrounding member or sleeve 16 to which may be attached at points spaced along the hose 4 a generally triangular suspension member 17 having the chain 12 looped about its upper apex as at 18.

A link support 20 may extend between the end valve fitting 2 and the adapter 9, as indicated in the drawing. The link support 20 has an eye 21 at one end positioned loosely to surround the nipple 2 which is associated with the end valve 1. The link support 20 has at its opposite end an eye portion 22 arranged to surround loosely a portion of the adapter 9. As will appear below, the link 20 may be hardened or otherwise designed to be stronger than the nipple 2.

A tying member or rod 25 may extend between the chain support 12 and link support 20. The tie rod 25 may be connected with the chain or flexible support 12 and may, in fact, have a looped end portion forming, in effect, one of the links in the chain 12, as shown generally at 26. The opposite end of the tie rod 25 may be pivotally secured to the link 20, as shown generally at 27. The rod or link 20 may have a series of apertures or connecting points, generally indicated at 28, to permit connection of the tying member 25 to the link 20 at a variety of points thereon. It will be realized that, while the tie member 25 is shown as a metallic rod, it could be formed of a cable or chain without departing from the nature and scope of my invention.

A hanger spring support 30 may depend from the draw bar 10 and may be connected to a lug 31 upstanding from an upper portion of the adapter 9 in order to provide a support for the adapter 9 in the outer end of the hose 4. An auxiliary chain support 32 may be connected at one end to the draw bar 10 as at 33 and at its opposite end to the tie rod 20 as at 34 in order to provide additional support for the adapter 9 and the outer end of the hose 4.

Whereas we have shown and described an operative form of our invention, we wish it to be understood that this showing and description thereof is to be taken in an illustrative or diagrammatic sense only, that there are many modifications of the invention falling within the scope and spirit of the invention which will be apparent to those skilled in the art. The scope of the invention, therefore, should be limited only by the scope of the hereinafter appended claims.

Figure 2:
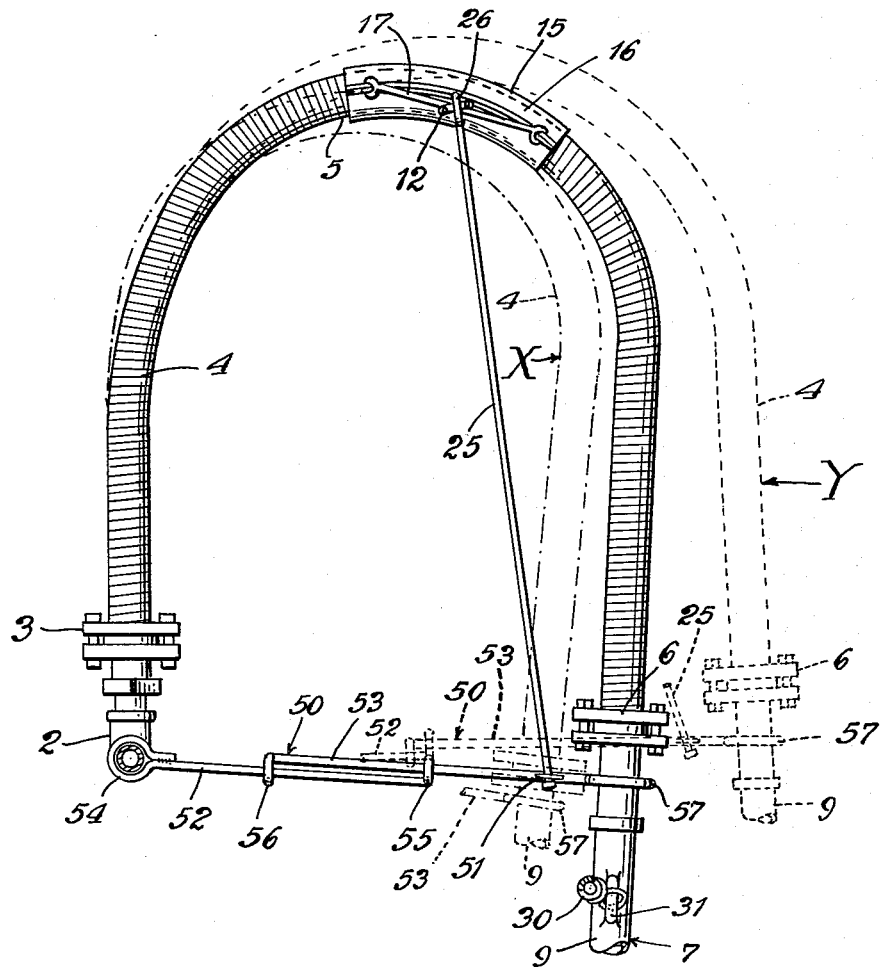
FIGURE 2 is a top view of a variant form of our invention.

Referring now to FIGURE 2, the numeral 50 illustrates generally a variant form of connector bar or pivot bar extending between the piping or elbow tube and the adapter 9. It will be noted, also, that the chain 32 has been removed, the spring 30 being the only connection between the adapter 9 and a part of the car, such as the bar 10. The rod 25 is shown as being loosely connected with an eye member 51 secured to and rising generally upwardly from the member 50.

As best seen in FIGURE 3, the member 50 comprises a pair of slidably-interlocked rod members 52, 53. Since the rods 52, 53 are so connected one with the other, the member 50 may be varied in length, thus permitting the hose 4 to move laterally of the rail car to which it is attached in response to the movement of the cars. This feature is illustrated in dotted lines in FIGURE 2, as indicated generally at X and Y. Since the chain 32 has been removed and since the spring 30 is, of course, expandable, little resistance is raised to the flexing or movement of the outer or adapter end of the hose 4.

The rod 52 has a looped end portion 54 of sufficient diameter to fit loosely about the piping connected to the fitting 1 on the car. At its opposite end, rod 52 has a looped portion lying in a plane generally perpendicular to its longitudinal axis. As best seen in FIGURES 3–6, the loop 55 of the rod 52 surrounds the rod 53 in a plane perpendicular to the longitudinal axis of the rod 53. Similarly, the rod 53 has at one end a looped portion 56 surrounding the rod 52 and lying in a plane generally perpendicular with the longitudinal axis of the rods 52, 53. The rod 53 has, at its opposite end, the loop or ring 57, lying in a plane generally perpendicular to the planes of the loops 54, 55, and 56. The loop 57 is of sufficient diameter to fit loosely about the adapter 9 or piping connected to the hose end fitting 6. The loop 57 is of sufficient diameter to fit loosely about the adapter 9 or piping connected to the hose end fitting 6. The eye element 51 is secured to the rod 53 adjacent the loop 57. As best seen in FIGURES 3–5, the loops 54—57 may be formed by bending the ends of the rods 52, 53 upon themselves and thereafter welding the adjacent surfaces together. Similarly, the eye 51 may be welded to the upper surface of the rod 53. As was the case with link 20, the member 50 is designed to be stronger than the nipple 2 which it surrounds at one end.

FIGURE 7 shows an alternate form of my support and conduit protecting means. In FIGURE 7, the numeral 2a generally indicates the nipple and fitting attached to the end valve 1a which is in turn attached beneath a freight car. A second fitting 3a connects the fitting and nipple 2a to the flexible conduit 4a. A supporting band or sleeve 5a may be wrapped around the conduit 4a at a point intermediate its ends and at approximately the center of the end generally indicated by the numeral 5b in the flexible conduit 4a. A breakable chain support 12a may be connected at one end to the band 5a and at the other end to the lower surface of a rail car as indicated generally, for example, at 13a. As best seen in FIGURE 8, the support 12a is connected to the rail car at a point inwardly spaced from the end of the car. A fitting 6a may be connected to the opposite end of the conduit 4a and may have connected thereto an adapter 9a which extends forwardly somewhat beyond the plane of the valve 1a and fitting 2a for connection to a corresponding member on a similarly installed conduit on an opposed rail car.

The numeral 100 generally indicates a pair of spaced parallel flanges or projections connected to the fitting. A removable pin 101 extends between and bridges the two flanges 100. A yoke 105 may comprise a pair of generally parallel spaced members 104. The members 104 may be joined adjacent their lower edges by a cross piece 106 to form a generally U-shaped support. The spaced members 104 may be curved or bent downwardly upon themselves adjacent their upper ends, as indicated generally at 107. A removable pin 110 may be inserted between and bridge the space between the two members 104 intermediate their upper and lower portions. The adapter element 9a, as best seen in FIGURE 7, extends loosely between the members 104 and beneath the pin 110 above the portion 106 for flexible support by the yoke 105. A spring support 30a may be connected at its upper end as at 30b to the under side of a railway car adjacent its end as best seen in FIGURE 8. The spring support 30a may have a depending hook element 30c engaging a portion of the member 25a.

The conduit protecting and support tying member 25a may be formed of relatively strong material and may extend between the fitting or nipple 2a, hook 30c, and the chain 12a. In FIGURES 7 and 8, for example, we show an integral triangular-shaped, rod-like member 25a. The member 25a has a bend 25b which turns about the removable pin 101 adjacent the nipple 2a. The member 25a has a forward leg 25c which extends from the point adjacent the nipple 2a to a position to be supported by the hook 30c. The hook 30c, for example, is shown as supporting the member 25a at another bend 25d therein, as best seen in FIGURE 7. The leg 25c extends through the yoke 105 causing the forward portion of the flexible conduit 4a and the adapter 9a to be slidably mounted on the leg 25c of the supporting member 25a. A rearwardly extending leg 25e of the member 25a extends from the hook 30c to a point adjacent the chain support 12a where, as indicated at 12b, a bend 25f is loosely connected to the chain support 12a. A third leg 25g joins the legs 25e, 25c and extends from the chain support 12a to a point adjacent the nipple 2a.

As best seen in FIGURE 7, the support 25a is free to move in all directions. There is sufficient room between the flanges 101, for example, to permit the support 25a to move up and down, to swivel about the pin 101 and even to pivot in a more or less vertical plane, as shown, for example, in dotted lines in FIGURE 7. The freedom of the outer flexible conduit end to slide on the leg 25c is illustrated in dotted lines in FIGURE 8. The yoke 105 permits the freedom of movement just described.

The use and operation of our device are as follows:

During normal operation, due to the swaying and movement of a vehicle to which conduits for steam, air, vacuum, gas, etc. are connected, such as adjacent rail cars, for example, the coupler member 7 and hose 4 are urged to move about the swivel beneath the end of the railway cars and beneath the draw bars 10. Since the eyes 21, 22 of the link support 20 have substantially larger inner diameters than those of the nipple 2 and adapter 9, it is clear that the elements are free to move in any direction in response to such swaying of the cars, the nipple 2 and adapter 9 being used, in effect, as trunnions for the tie rod end portions 21, 22, as the link 20 swivels thereon. The dotted lines of FIGURE 2 indicate one position of the hose 4 in the course of such movement. The supporting elements shown in FIGURE 1 are effective to spread the stresses and strains experienced or incurred by the flexible conduit 4, 4a throughout the length of the conduit and to prevent the concentration thereof at any one point.

Should the adjacent rail cars be separated without a prior separation of the coupler 8 from its corresponding member on the opposite car, the coupler member 7 would begin to be pulled or drawn outwardly away from the end of its associated car, or to the left as the parts are shown in the drawing. If the hose 4 were not properly supported, it is clear that the hose would be stretched out and injured or destroyed. The flexible hose 4, for example, is metallic and may be corrugated or spiraled. Stretching of such hose destroys its further usefulness. It will be noted that the link 20, tie rod 25, and supports 12, 30, and 32 are each substantially shorter in length than is the hose 4 in order to impede and prevent such stretching of the hose. The force tending to stretch the hose 4 is exerted through coupler 8, adapter 9 and link 20 to the nipple 2. If the coupler member 8 does not separate from its corresponding coupler member on the adjacent car, we provide for the progressive breaking down of the hose-supporting structure above-described. Some portions of the elements of such supporting structure could be made weaker than others in order to render the supports frangible to insure the desired breaking point and force at which the supports will break. The link 20, the extensible member 50, and the member 25c are all made stronger than the nipple or fitting 2, 2a. Thus, the result, if the coupler 8 is not separated from its corresponding part on the adjacent rail car, the first thing that will happen is that the force exerted will be against the nipple 2, 2a through the coupler 8, adapter 9, link 20 (or member 50 or 25a) this will cause the entire flexible conduit to be torn loose from the box car as a unit or a whole and will retain the flexible conduit intact. The tie rod 25 tends to insure that the rear support 12 will break approximately simultaneously with the supports 32, 30 so as to prevent any stretching or pulling of the hose 4 which would occur if the support 12 were not broken at about the same time as the supports 32 and 30 are broken. The same is true in the device of FIGURES 7 and 8. In the latter device, the member 25a, being triangular and being associated with the rear support 12a, the forward support 30a and the nipple or fitting 2a, is effective to insure that the nipple will break to release the entire flexible conduit and that the two supports 12a, 30a will break or shear or be torn loose simultaneously, thereby retaining the flexible conduit in substantially its original intact condition for reinstallation and re-use.

The cost of the conduit-protecting structure illustrated in the drawings herein is obviously a great deal less than the cost of even one such conduit.

When the connecting member 50 is employed, as illustrated in FIGURE 2, the hose 4 is permitted to move or flex laterally of the rail car without injury to the hose. Since the movement of the hose is generally in the plane of the bent portion thereof and since the entire hose end moves, it is clear from the illustration in FIGURE 2 that the stresses and strains on the hose are spread over almost the entire surface of the hose and are not permitted to be concentrated in any one point. The loops 55, 56 permit the member 50 to be extended or contracted a substantial distance and are so designed in each particular case to permit whatever hose movement is to be anticipated in a particular installation. Since the loops 54, 57 have a diameter somewhat larger than that of the piping which they surround, it is clear that the outer hose end is free to move not only laterally of the cars but also upwardly and downwardly and forwardly and rearwardly. The forward and rearward movement is illustrated in dotted lines in FIGURE 2.

In the device of FIGURES 7 and 8, the yoke 105 permits the outer hose end and fitting 6a to slide to left or right on the leg 25c of the member 25a. Since the adapter 9a fits loosely within the yoke 105, the hose end and fitting 6a and adapter 9a are free to move forwardly and rearwardly within the yoke and this freedom is due also to the fact that the member 25a is free to pivot or swivel about the pin 101. Similarly, the outer end of the conduit 4a is free to move upwardly or downwardly since the member 25a is free to so move as indicated in the dotted lines of FIGURE 7.

It will be observed that the flanges 100 are associated with a nipple 2b which is horizontally disposed and extends rearwardly from the L 2c. As is well known, the nipple 2b is in threaded engagement with the L 2c. Thus, when and if a pull force is exerted on the adapter 9a and fitting 6a, this force will be transmitted through the yoke 105, leg 25c of the member 25a, pin 101, and flanges 100 to the nipple 2b. Since such pull force is exerted more or less in a direction paralleling that of the nipple 2b, the member 25a will pull, through the pin 101 and flanges 100, the nipple in a turning or rotating motion and will have a destructive effect on the threaded engagement of the nipple 2b with the L 2c.

Whereas we have described and shown our invention as being applied to railway cars, it will be realized that the invention is applicable to other situations wherein steam, air vacuum, or gas conduits must be supported while being subjected to vibration and movement, without departing from the nature and scope of our invention.

We claim:

1. In a railway car, a fixed fitting connected to said car, a fitting member connected to said fixed fitting, a flexible conduit connected at one end to said fitting member and extending beneath said car and having its opposite end directed outwardly from beneath said car, a coupler member on said opposite end of said conduit, a flexible support connected to said conduit intermediate its ends and to said rail car to movably support said conduit, a protective member movably connected to said fitting member and to said flexible support, means for connecting the coupler member and said protective member for relative movement, means for limiting the relative movement between the coupler member and said protective member longitudinally of said coupler member and for transmitting force from the coupler member to said protective member, said protective member being stronger than said fitting member and stronger than said flexible support, and the distance between the points of connection of said protective member with said coupler member and said fitting member, and the distance between the points of connection of the protective member with said coupler member and with said flexible support are both shorter than the length of the conduit portions between the point of connection of the flexible support to the conduit and the fitting member and said coupler member respectively, whereby forces transmitted through said coupler member tending to draw said flexible conduit outwardly from beneath said rail car are transmitted to said protective member and through said protective member to said fitting member and to said flexible support to cause said fitting member and said flexible support to break to separate said flexible conduit intact from said rail car.

2. The construction described in claim 1 wherein the flexible conduit is bent upon itself intermediate its ends to provide a loop formation and wherein said flexible support is connected to the conduit within said loop portion.

3. In combination, a hose connection for railway cars and the like comprising an elongated flexible hose, a fitting member at one end of said hose adapted for connection to a fixed fitting on a railway car, a coupler member at the opposite end of said hose, a flexible support secured to said hose intermediate its ends and adapted for attachment to a railway car, a rigid supporting member movably connected to said fitting member, to said flexible support and to said coupler member, means for limiting the relative movement between the coupler member and said rigid supporting member longitudinally of said coupler member and for transmitting force from the coupler member to said rigid supporting member, means on said fitting and coupler members and on said flexible support for retaining said rigid supporting member in force-transmitting engagement with both the fitting member and said flexible support, said rigid supporting member being of greater strength than said flexible support and of greater strength than said fitting member, said fitting member and said coupler member being disposed in proximity to one another to provide a looped portion in said hose to which the flexible support is connected at a point providing hose portions on either side of said point and the respective opposite ends of the hose which are greater in length than the length of said rigid supporting member between the coupler member and the fitting member and also greater in length than the distance between said point of connection and the point of connection of said rigid supporting member with said coupler member, whereby forces exerted on said coupler member are transmitted thereby through said rigid supporting member to said fitting member and to said flexible support to cause said fitting member and said flexible support to break to separate said flexible hose intact from said rail car.

4. The apparatus described in claim 3 wherein said rigid supporting member includes a rigid rod member movably connected to the coupler member and to the fitting member, and a rigid tie member connected at one end to said rigid rod member and at its opposite end to said flexible supporting member.

5. The apparatus described in claim 4 wherein the rigid rod member is of a length appreciably shorter than that of said rigid tie member.

6. The apparatus described in claim 4 wherein the rigid tie member has a strength at least equal to that of said rigid rod member and greater than the strength of said flexible support.

7. The structure of claim 3 wherein said rigid supporting member comprises a rod member pivotally connected at its opposite ends to said fitting member and said coupler member and being comprised of two rod portion slidably connected one to the other.

References Cited in the file of this patent

UNITED STATES PATENTS

| | | |
|---|---|---|
| 352,552 | McKinney | Nov. 16, 1886 |
| 1,149,727 | Carence et al. | Aug. 10, 1915 |
| 1,279,006 | Rose | Sept. 17, 1918 |
| 1,289,798 | Jolliff | Dec. 31, 1918 |
| 1,307,669 | Hino | June 24, 1919 |
| 1,313,225 | Gootee | Aug. 12, 1919 |
| 1,589,801 | Gold | June 22, 1926 |
| 1,858,646 | Sullivan | May 17, 1932 |
| 2,034,558 | Bronson | Mar. 17, 1936 |
| 2,048,388 | Johnsen | July 21, 1936 |
| 2,078,733 | Ryan | Apr. 27, 1937 |